United States Patent
Koontz

(10) Patent No.: US 9,587,669 B2
(45) Date of Patent: Mar. 7, 2017

(54) TERMINAL FOR A MOTION TRANSMITTING REMOTE CONTROL ASSEMBLY

(71) Applicant: Kongsberg Driveline Systems I, Inc., Novi, MI (US)

(72) Inventor: Harry Edward Koontz, Troy, MI (US)

(73) Assignee: KONGSBERG DRIVELINE SYSTEMS I, INC., Novi, MI (US)

( * ) Notice: Subject to any disclaimer, the term of this patent is extended or adjusted under 35 U.S.C. 154(b) by 0 days.

(21) Appl. No.: 14/428,857

(22) PCT Filed: Oct. 11, 2013

(86) PCT No.: PCT/US2013/064588
§ 371 (c)(1),
(2) Date: Mar. 17, 2015

(87) PCT Pub. No.: WO2014/059303
PCT Pub. Date: Apr. 17, 2014

(65) Prior Publication Data
US 2015/0233414 A1    Aug. 20, 2015

Related U.S. Application Data

(60) Provisional application No. 61/712,528, filed on Oct. 11, 2012.

(51) Int. Cl.
*F16C 11/04* (2006.01)
*F16C 7/06* (2006.01)

(52) U.S. Cl.
CPC .............. *F16C 11/045* (2013.01); *F16C 7/06* (2013.01); *Y10T 74/2151* (2015.01); *Y10T 403/32951* (2015.01)

(58) Field of Classification Search
CPC . F16C 11/045; F16C 11/0642; F16C 11/0623; F16C 1/145; F16C 1/14; Y10T 74/2045; Y10T 403/32319
See application file for complete search history.

(56) References Cited

U.S. PATENT DOCUMENTS 5,265,495 A * 11/1993 Bung ...................... F16C 1/108
                                                       403/120
6,748,820 B2 * 6/2004 Ruhlander .............. F16C 1/108
                                                       403/141

(Continued)

FOREIGN PATENT DOCUMENTS

EP    0183341 A3    6/1986

OTHER PUBLICATIONS

International Search Report for PCT/US2013/064588; Dated Jan. 16, 2014; 3 pages.

(Continued)

*Primary Examiner* — Thomas Diaz
(74) *Attorney, Agent, or Firm* — Howard & Howard Attorneys PLLC

(57) ABSTRACT

A terminal (10) for a motion transmitting remote control assembly (12) securable to a control member (14) in a vehicle includes a housing (44) for connection to a core element (20) of the motion transmitting remote control assembly (12) with the housing (44) defining an aperture (48) forming at least one open end (50). The terminal (10) also includes a connecting member (60) having a body (62) disposed in the aperture (48) with the body (62) having a cavity (66) for receiving the control member (14) and a groove (84) in communication with the cavity (66). The terminal (10) further includes a retainer (90) mounted to the connecting member (60) and disposed in the groove (84) of the body (62) with the retainer (90) disposed in the aperture (48) when the connecting member (60) is in the housing (44)

(Continued)

and the retainer (90) extending into the cavity (66) for engaging the control member (14) to retain the terminal (10) to the control member (14) and to prevent non-destructive removal of the terminal (10) from the control member (14).

22 Claims, 4 Drawing Sheets

(56) References Cited

U.S. PATENT DOCUMENTS

| | | |
|---|---|---|
| 2003/0223805 A1 | 12/2003 | Ruhlander |
| 2010/0251847 A1 | 10/2010 | Gordy |
| 2012/0000310 A1 | 1/2012 | Na et al. |

OTHER PUBLICATIONS

English language equivalent of DE 10 2010 060645 A1, see U.S. Pat. No. 2012/0000310, Published Jan. 5, 2012.

* cited by examiner

TERMINAL FOR A MOTION TRANSMITTING REMOTE CONTROL ASSEMBLY

RELATED APPLICATIONS

This application claims priority to and all the advantages of International Patent Application No. PCT/US2013/064588, filed on Oct. 11, 2013, which claims priority to U.S. Provisional Patent Application No. 61/712,528, filed on Oct. 11, 2012.

BACKGROUND OF THE INVENTION

1. Field of the Invention

The present invention relates generally to motion transmitting remote control assemblies and, more particularly, to a terminal for a motion transmitting remote control assembly.

2. Description of the Related Art

It is known to provide a motion transmitting remote control assembly for a vehicle. Typically, the motion transmitting remote control assembly includes a conduit supporting a motion transmitting core element and a terminal connected to the core element to connect the core element to a control member. Such assemblies are frequently used in vehicles such as automotive vehicles to transmit rectilinear motion from the vehicle operator to various systems and accessories in the vehicle.

In some of these assemblies, the terminals may be removed from the control member. As such, it is desirable to provide a terminal for a motion transmitting remote control assembly that is non-removably attached to the control member. It is also desirable to provide a terminal for a motion transmitting remote control assembly that may be installed without fasteners or other devices. It is further desirable to provide a terminal for a motion transmitting remote control assembly such that installation of the terminal uses low insertion forces. Therefore, there is a need in the art for a terminal and motion transmitting remote control assembly that meets at least one of these desires.

SUMMARY OF THE INVENTION

Accordingly, the present invention is a terminal for a motion transmitting remote control assembly securable to a control member in a vehicle. The terminal includes a housing for connection to a core element of the motion transmitting remote control assembly with the housing defining an aperture forming at least one open end. The terminal also includes a connecting member having a body disposed in the aperture with the body having a cavity for receiving the control member and a groove in communication with the cavity. The terminal further includes a retainer mounted to the connecting member and disposed in the groove of the body with the retainer disposed in the aperture when the connecting member is in the housing and the retainer extending into the cavity for engaging the control member to retain the terminal to the control member and to prevent non-destructive removal of the terminal from the control member.

In addition, the present invention is a motion transmitting remote control assembly securable to a control member in a vehicle. The assembly includes a conduit, a core element movably supported in the conduit, and a terminal coupled to the conduit for connecting the core element to the control member. The terminal has a housing coupled to the core element with the housing defining an aperture forming at least one open end. The terminal also has a connecting member having a body disposed in the aperture with the body having a cavity for receiving the control member and a groove in communication with the cavity. The terminal further has a retainer mounted to the connecting member and disposed in the groove of the body with the retainer disposed in the aperture when the connecting member is in the housing and the retainer extending into the cavity for engaging the control member to retain the terminal to the control member and to prevent non-destructive removal of the terminal from the control member.

One advantage of the present invention is that a new terminal and motion transmitting remote control assembly is provided for a vehicle. Another advantage of the present invention is that terminal is non-removably attached to the control member. Yet another advantage of the present invention is that the design of the terminal may be adjusted to accommodate vehicle requirements and different pin geometries of the control member. Still another advantage of the present invention is that the terminal may be installed using a one-step process, and such installation does not require any fasteners or other devices to non-removably attach the terminal to the pin of the control member. A further advantage of the present invention is that installation of the terminal is such that it is non-removable from the pin of the control member using low insertion forces. As such, the terminal may be easily installed in any manufacturing facility.

Other features and advantages of the present invention will be readily appreciated, as the same becomes better understood, after reading the subsequent description taken in conjunction with the accompanying drawings.

DESCRIPTION OF THE PREFERRED EMBODIMENT(S)

Figure 1:
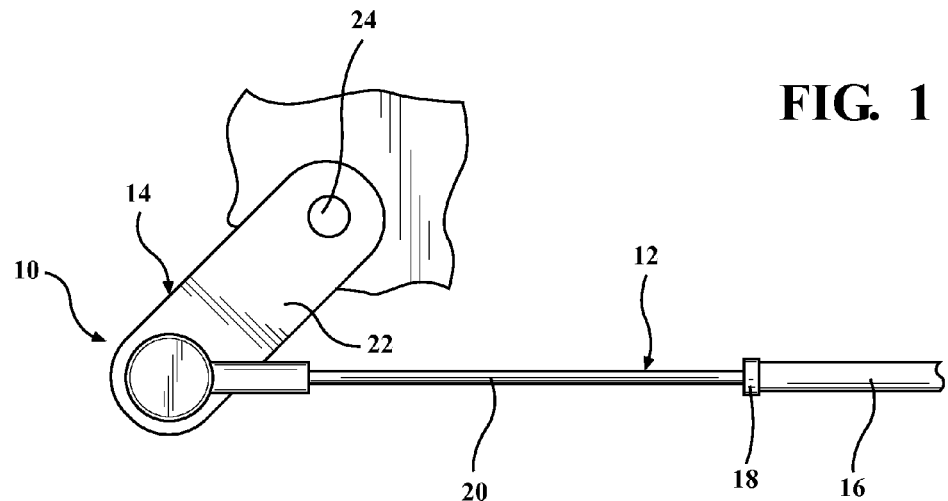
FIG. 1 is a schematic elevational view of a motion transmitting remote control assembly, according to one embodiment of the present invention.

Referring now to the drawings, and in particular FIG. 1, one embodiment of a terminal, according to the present invention, is generally shown at 10 for a motion transmitting remote control assembly, generally indicated at 12. Examples of the terminal 10 of the motion transmitting remote control assembly 12, as disclosed herein, may be used to connect the assembly 12 to an operating or control member, generally indicated at 14, operatively disposed in a vehicle. In one embodiment illustrated in FIG. 1, the motion transmitting remote control assembly 12 includes a conduit 16 having an end portion connected to a rigid tube member (not shown) and a wiper member 18 may be mounted on the end of the conduit 16. The motion transmitting remote control assembly 12 further includes a core element 20 disposed within the conduit 16 for reciprocating linear movement therein. It should be appreciated that the wiper member 18 engages the core element 20 to provide a seal thereabout to prevent the ingress of foreign particles into the conduit 16. It should also be appreciated that the seal is optional and may not be used for vehicle interior applications.

The motion transmitting remote control assembly 12 includes the terminal member 10 for operatively interconnecting the core element 20 and the control member 14. The control member 14 may take the form of a lever 22 which is supported upon a rotatable actuating shaft 24. The core element 20 defines a line of force whereby, upon longitudinal movement of the core element 20 along the line of force defined thereby, the control member 14 is rotated which, in turn, rotates the actuating shaft 24. It should be appreciated that the terminal member 10 interconnects the core element 20 and the control member 14 so as to translate the linear movement of the core element 20 into pivoting or rotational movement of the shaft 24 via the lever 22 and the terminal member 10 provides a pivoting connection of the core element 20 to the lever 22 of the control member 14.

Figure 2:
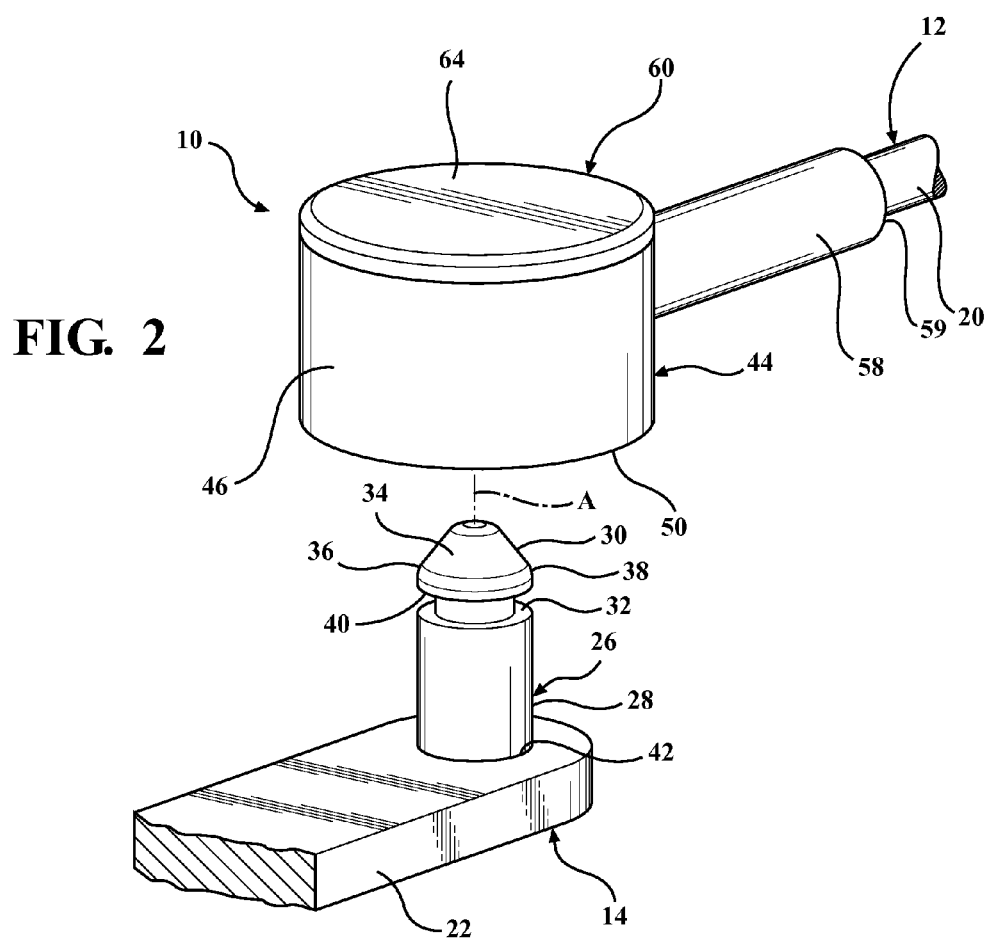
FIG. 2 is an exploded perspective view of a terminal, according to one embodiment of the present invention, of the motion transmitting remote control assembly and a control member of FIG. 1.

To accomplish this function, the control member 14 includes a projection such as a pin, generally indicated at 26 in FIG. 2, connected to the lever 22 and to which the terminal 10 is attached. As illustrated in FIG. 2, the pin 26 includes a body portion 28, a head portion 30, and an annular groove 32 formed between the body portion 28 and the head portion 30. The head portion 30 includes a tapered surface 34 having an edge 36, and further includes a flat surface 38 extending from the edge 36 to a surface 40 of the annular groove 32. The body portion 28 may extend integrally from the lever 22 or may include a threaded portion (not shown) to be connected to a threaded bore 42 in the lever 22 of the control member 14. In the illustrated embodiment, which is discussed in greater detail below, the terminal 10 is designed to be non-removably attached to the pin 26. In this embodiment, the terminal 10 may be removed by destroying the terminal 10 or removing the entire motion transmitting remote control assembly 12 from the vehicle. It should be appreciated that, by this design, it is believed that one may prevent easy detachment from the control member 14 during, e.g., an unlawful taking of the vehicle. It should also be appreciated that, in another non-illustrated embodiment, the terminal 10 includes an access (not shown) enabling removal of the terminal 10 from the pin 26 of the control member 14, e.g., utilizing special tooling and/or removal techniques. It should be further appreciated that removal of the terminal 10 may be useful for servicing and maintenance of the vehicle.

Referring to FIGS. 2 through 7, the terminal 10 includes a housing, generally indicated at 44, for connection to the core element 20 of the motion transmitting remote control assembly 12. The housing 44 has a generally cylindrical body 46 and defines an aperture 48 forming at least one open end 50. In the embodiment illustrated, the aperture 48 forms a pair of opposed open ends 50. The cylindrical body 46 has a generally circular cross-sectional shape, but may be any suitable shape. The aperture 48 is generally circular in shape, but may be any suitable shape. The body 46 has an interior surface 52 along the aperture 48 and an exterior surface 54. The housing 44 includes at least one slot 56 extending along the aperture 48. In the embodiment illustrated, the interior surface 52 includes the slot 56 formed therein, and the slot 56 extends axially between the opposing ends 50. In the embodiment illustrated in FIG. 3, two slots 56 are formed in the interior surface 52 of the body 46. The slots 56 are generally rectangular in shape, but may be any suitable shape, to receive complementary tabs 72 of a connecting member 60 to be described when the connecting member 60 is assembled with the housing 44. The housing 44 also includes a rod 58 integrally formed with the body 46. In one embodiment, the rod 58 is cylindrically shaped and has an open end 59 to receive the core element 20 therein. The housing 44 is made of a rigid material, for example a plastic material, and is integral, unitary, and one-piece. It should be appreciated, however, that the body 46 may be designed as desired, and may include a single slot 56 or more than two slots 56. It should also be appreciated that the slot 56 is optional and may not be needed if the housing 44 has a shape that prevents rotation relative to the pin 26.

The terminal 10 also includes a connecting member, generally indicated at 60, having a body 62 disposed in the aperture 48 and a cap 64 extending radially outwardly from the body 62 to close the at least one open end 50. In the embodiment illustrated, the cap 64 is integrally formed with the body 62. The body 62 has a cavity 66 for receiving the pin 26 of the control member 14. The cavity 66 is generally cylindrical in shape with a generally circular cross-section, but may have any suitable shape to receive the pin 26. In the embodiment illustrated, the body 62 has a surface 68 that has a complementary shape as the interior surface 52 of the body 46 of the housing 44. The surface 68 of the body 62 also has a diameter sufficient for the body 62 to fit inside the body 46 of the housing 44. In one embodiment, the body 62 is tightly fit inside the body 46. It should be appreciated that the tight fit may be achieved by configuring the diameter of the body 62 to be just a fraction smaller than the diameter of the body 46.

The body 62 includes at least one slit 70 to allow the body 62 to be press fit inside the aperture 48. In the embodiment illustrated in FIG. 3, one or more slits 70 are formed into the body 62 to provide some tolerance for the tight fit. It should be appreciated that the presence or absence of the slits 70 formed in the body 62 depends, at least in part, on the hardness (e.g., durometer) of the material used to form the body 62. In instances where the material of the body 62 is formed from an elastomeric material or from a material that is at least partially deformable, then the body 62 may be formed with or without slits 70. In another example, the body 62 is press fit inside the body 46 of the housing 44.

Figure 3:
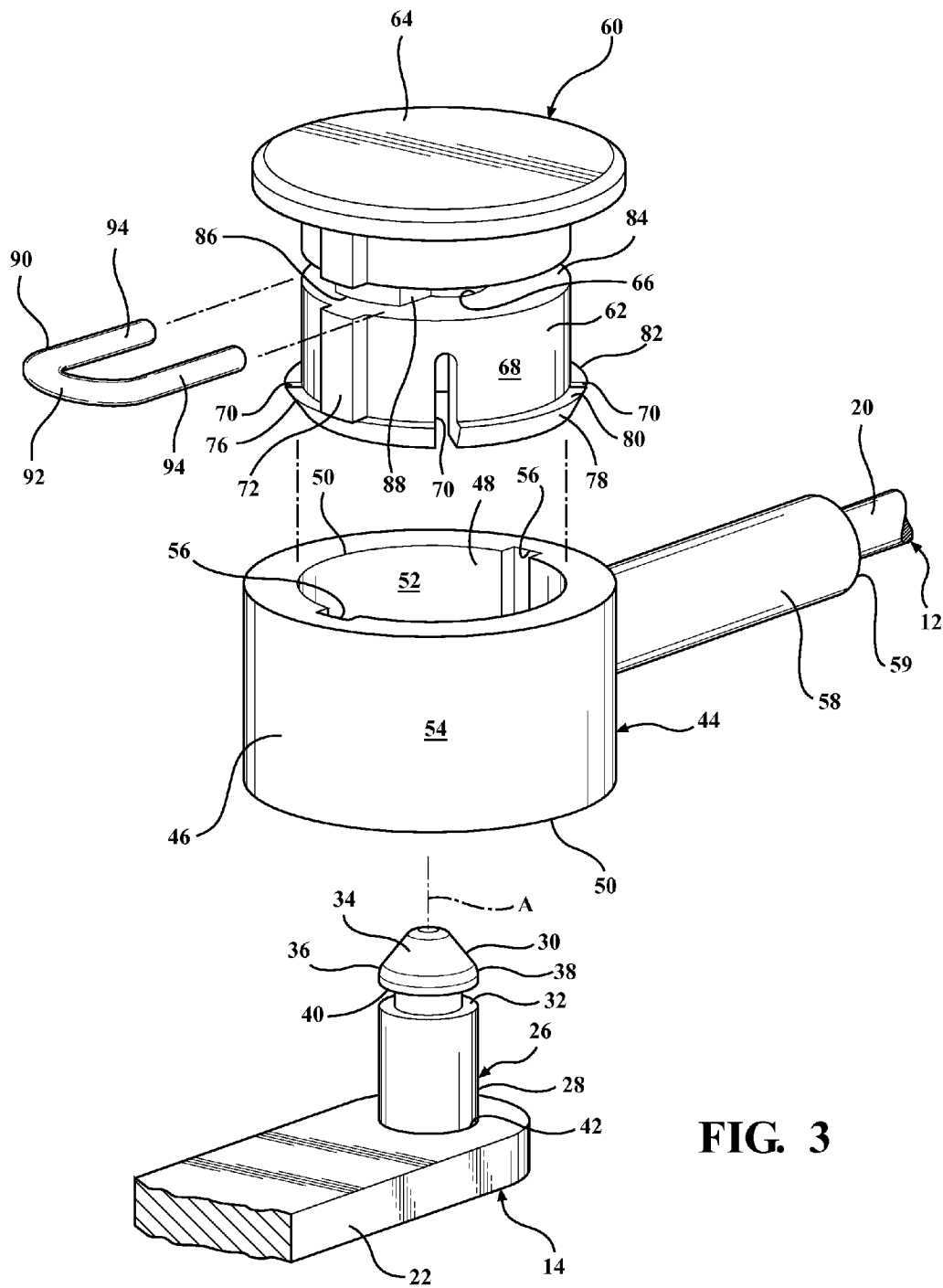
FIG. 3 is an exploded perspective view of the terminal of FIG. 2.
Figure 4:
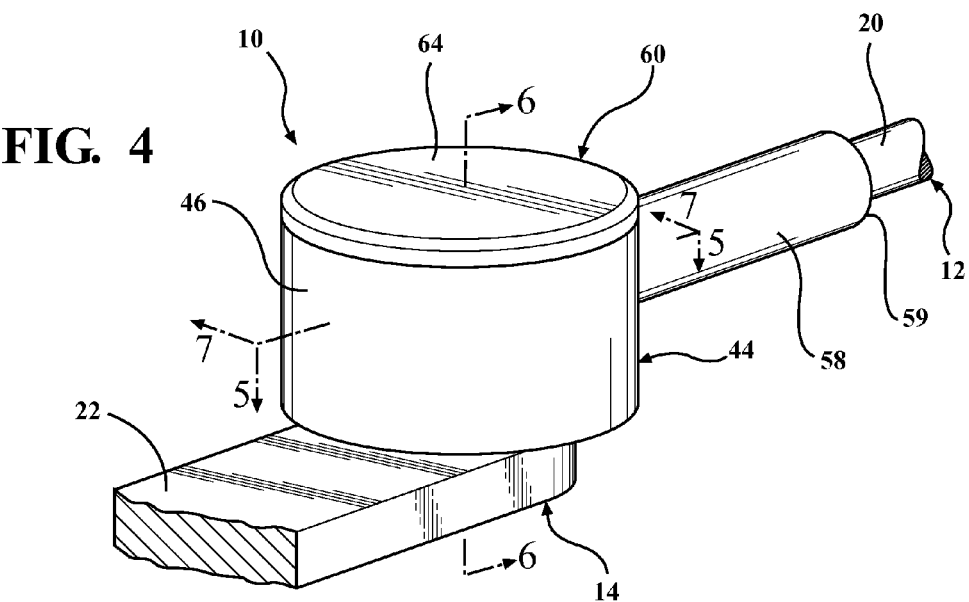
FIG. 4 is a perspective view of the terminal attached to the control member of FIG. 1.

The body 62 includes at least one tab 72 extending radially outwardly to be received in the at least one slot 56 of the housing 44 to align the connecting member 60 with the housing 44 when assembled together. In the embodiment illustrated, one or more tabs 72 are integrally formed on the surface 68 of the body 62, and as previously mentioned, are designed to be received in respective slots 56 of the housing 44. Although one tab 72 is shown in FIG. 3, it should be appreciated that another tab 72 is formed on the other side of the body 62 of the connecting member 60. The tabs 72 are generally rectangular in shape, but may be any suitable shape to be received in the slots 56. It is further to be understood that the number of tabs 72 formed on the body 62 will depend on the number of slots 56. For instance, when the housing 44 includes three slots 56, then the connecting member 60 will include three respective, complementary tabs 72. The tabs 72 and respective slots 56 are used to align the connecting member 60 with the housing 44 when assembled together. It should be appreciated that alignment of the housing 44 and connecting member 60 may be desirable, for instance, to align the terminal 10 with the axis A of the load as illustrated in FIG. 3.

The connecting member 60 includes a flange 76 extending radially outwardly from the body 62 and cooperating with the housing 44 to provide a snap-fit therebetween. In the embodiment illustrated, the flange 76 is formed at an end of the body 62 opposite from the cap 64. The flange 76 includes a tapered surface 78 and a flat surface 80, the flat surface 80 abutting the housing 44 when the body 62 extends through the aperture 48. As illustrated, the tapered surface 78 starts at the end of the body 62, and has a diameter that is a fraction smaller than the diameter of the interior surface 52 of the body 46 of the housing 44. The diameter at the starting point of the tapered surface 78 enables the body 62 of the connecting member 60 to fit inside the body 46 of the housing 44. The tapered surface 78 gradually increases in diameter until it reaches an outer edge 82 of the flat surface 80 of the flange 76. It should be appreciated that, during assembly of the terminal 10 (which will be described in further detail below), the flange 76 will cause the connecting member 60 to snap into place when the body 62 of the connecting member 60 is inserted into the body 46 of the housing 44.

Figure 5:
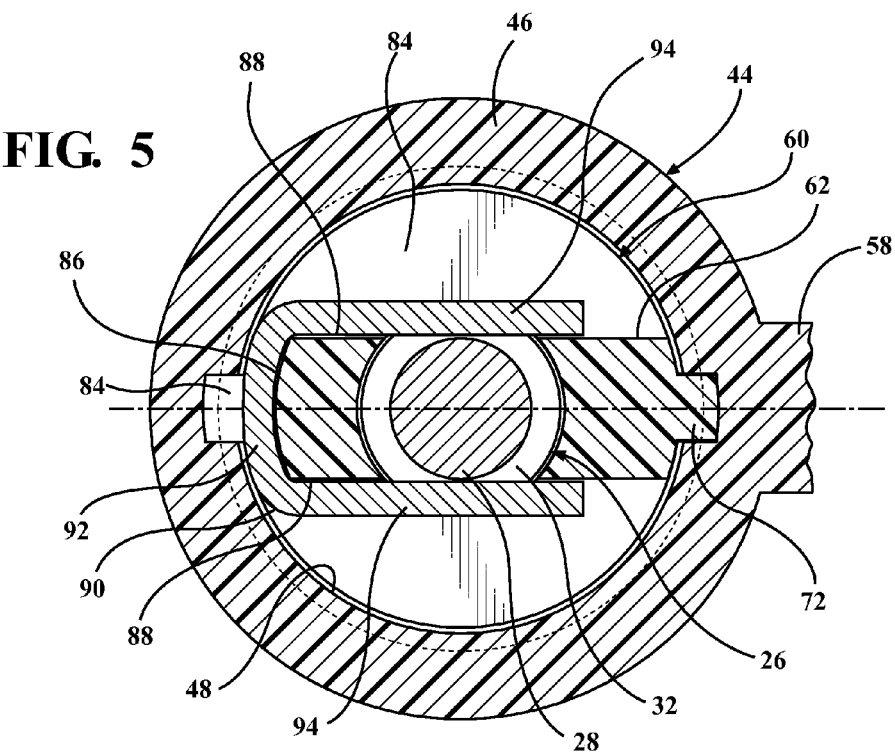
FIG. 5 is a sectional view taken along line 5-5 of FIG. 4.
Figure 6:
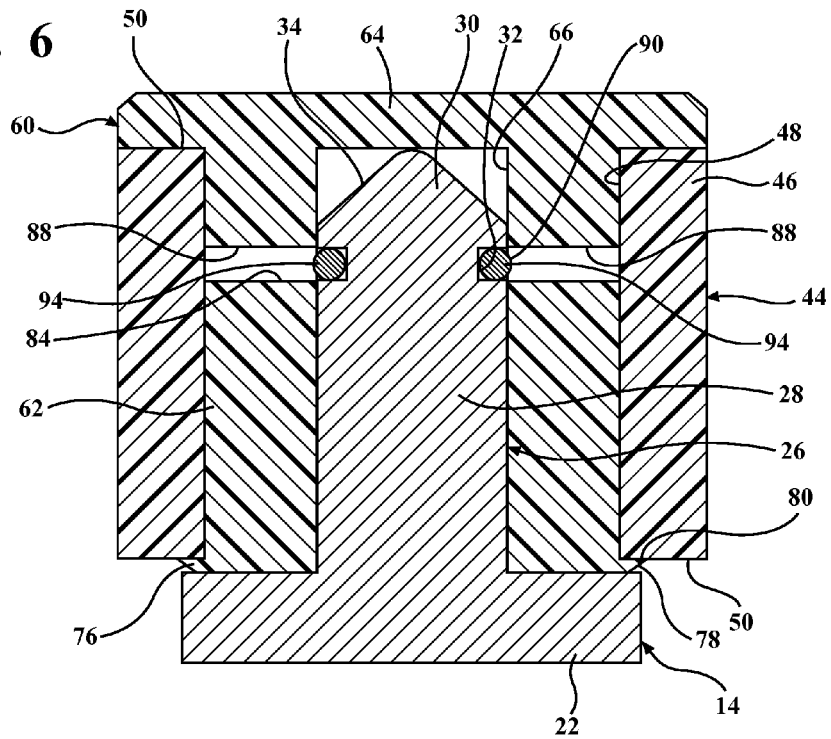
FIG. 6 is a sectional view taken along line 6-6 of FIG. 4.
Figure 7:
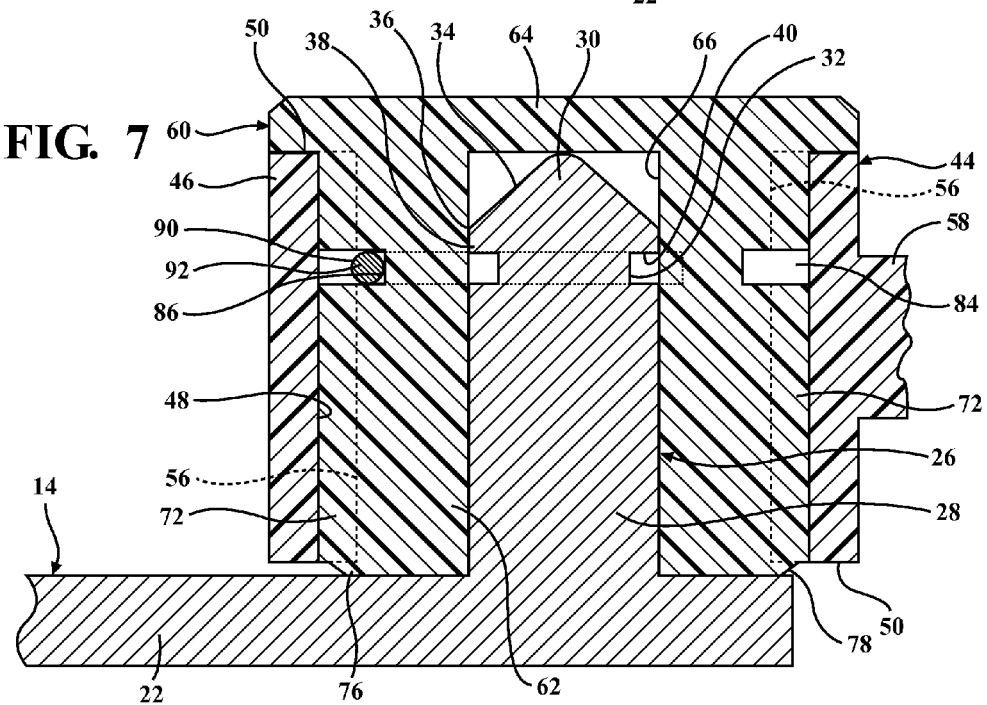
FIG. 7 is a sectional view taken along line 7-7 of FIG. 4.

The connecting member 60 also has a groove 84 extending into the body 62 in communication with the cavity 66. The groove 84 is annular and defines a base portion 86 and a pair of leg portions 88 extending from the base portion 86 and in communication with the cavity 66. As illustrated in FIGS. 3 and 5, the groove 84 is shaped and configured to receive a retainer 90 to be described therein. The groove 84 is spaced axially from the flange 76 for aligning the groove 84 with the groove 32 in the pin 26 of the control member 14 when the pin 26 is inserted into the cavity 66. In the embodiment illustrated, the groove 84 is formed in the body 62 at a position between the flange 76 and the cap 64 such that when the pin 26 is inserted into the cavity 66 (described below), the groove 84 aligns with the groove 32 formed in the pin 26.

The terminal 10 further includes a retainer 90 mounted to the connecting member 60 and disposed in the groove 84 of the body 62 with the retainer 90 disposed in the aperture 48 when the connecting member 60 is in the housing 44 and the retainer 90 extending into the cavity 66 for engaging the pin 26 of the control member 14 to retain the terminal 10 to the control member 14 and to prevent non-destructive removal of the terminal 10 from the control member 14. The retainer 90 has a base 92 and a pair of legs 94 extending from the base 92 and spaced from each other and adapted to be deflected apart by the pin 26 of the control member 14 when the terminal 10 is attached to the pin 26 of the control member 14. In the embodiment illustrated in FIG. 3, the retainer 90 is of a clip type having a general U-shape, but may be any suitable shape that allows the legs 94 to spread apart and recoil back. The retainer 90 is formed from a material enabling the legs 94 to be spread apart, e.g., when the terminal 10 is attached to the pin 26 (shown in, and described below in conjunction with FIGS. 5 through 7) of the control member 14. The material chosen for the retainer 90 also enables the legs 94 to recoil after the legs 94 have been spread apart. It should be appreciated that the base 92 is disposed in the base portion 86 and the legs 94 are disposed in the leg portions 88 and that a portion of the body 62 is disposed between the base 92 and legs 94.

Referring to FIGS. 3 through 7, a method for assembling the terminal 10 is shown. The retainer 90 is inserted into the annular groove 84 formed in the body 62 of the connecting member 60. Then, the body 62 of the connecting member 60 is inserted into the body 46 of the housing 44. In one embodiment, when the body 60 is inserted into the body 46, the flange 76 snaps through the open end 50 of the body 46 so that the flat surface 80 of the flange 76 rests on the open end 50.

During assembly of the terminal 10 and the pin 26, the head portion 30 of the pin 26 enters the cavity 66 as a force is exerted on the cap 64 of the terminal 10. When this force is exerted, the terminal 10 is pushed onto the pin 26. While the pin 26 is being inserted into the cavity 66 of the body 62, the tapered surface 34 of the head portion 30 of the pin 26 will spread the legs 94 of the retainer 90 that was previously inserted into the groove 84 of the body 62 of the connecting member 60. After the head portion 30 passes through the retainer 90, the groove 32 of the pin 26 will be aligned with the groove 84 of the body 62 and the legs 94 of the retainer 90 will recoil and snap into the grove 32 of the pin 26. The terminal 10 is then assembled to the pin 26 of the control member 14.

It has been found that the retainer 90 cannot be disengaged from the pin 26 after the retainer 90 has been snapped in the groove 32 of the pin 26. When the terminal 10 has been installed on the pin 26, the flange 76 formed on the body 62 of the connecting member 60 cannot collapse to disengage from the terminal 10 because the pin 28 is disposed inside the cavity 66 of the body 62 and the flange 76 extends through the open end 50 of the housing 44 such that the flat surface 80 abuts a flat surface of the open end 50 of the housing 44. It should be appreciated that the diameter of the pin 26 does not allow the body 62 of the connecting member 60 to collapse radially inward when disposed in the cavity 66 to allow the flange 76 of the body 62 to collapse radially inward to move through the open end 50 of the housing 44.

In addition, the cap 64 of the connecting member 60 prevents the terminal 10 from disengaging along the axis A of the pin 26 when assembled. The cap 64 prevents access to the retainer 90 disposed inside the housing 44 and within the groove 84 of the body 62 of the connecting member 60 such that the retainer 90 cannot be disengaged from the groove 32 of the pin 26. Further, the terminal 10 may have a flange extending radially outward from the housing 44 adjacent the open end 50 next to the control member 14 when installed to prevent access to the flange 76. As such, the terminal 10 cannot be non-destructively removed from the pin 26. It should be appreciated that the alignment of the connecting member 60 with the axis A (as mentioned above) ensures that the legs 94 of the retainer 90 do not experience a loading along axis A, thereby ensuring that the terminal 10 will remain mounted to the pin 26. It should also be appreciated that, when the terminal 10 is installed onto the pin 26, it acts as a theft deterrent terminal due to its high retention to the pin 26 and its inability to be removed in a non-destructively manner.

The present invention has been described in an illustrative manner. It is to be understood that the terminology, which has been used, is intended to be in the nature of words of description rather than of limitation.

Many modifications and variations of the present invention are possible in light of the above teachings. Therefore, the present invention may be practiced other than as specifically described.

What is claimed is:

1. A terminal (10) for a motion transmitting remote control assembly (12) securable to a control member (14) in a vehicle, said terminal (10) comprising:

a housing (44) for connection to a core element (20) of the motion transmitting remote control assembly (12) with said housing (44) defining an aperture (48) forming at least one open end (50);

a connecting member (60) having a body (62) disposed in said aperture (48) with said body (62) having a cavity (66) for receiving the control member (14) and a groove (84) in communication with said cavity (66) and a load axis (A) extending axially through said cavity (66) of said body (62); and a retainer (90) disposed transversely to said load axis (A) and disposed in said groove (84) of said body (62) with said retainer (90) disposed in said aperture (48) when said connecting member (60) is in said housing (44) and said retainer (90) extending into said cavity (66) for engaging the control member (14) to retain said terminal (10) to the control member (14) and to prevent non-destructive removal of said terminal (10) from the control member (14).

2. A terminal (10) as set forth in claim 1 wherein said retainer (90) has a base (92) and a pair of legs (94) extending from said base (92) and spaced from each other and adapted to be deflected apart by the control member (14) when said terminal (10) is attached to the control member (14).

3. A terminal (10) as set forth in claim 2 wherein said groove (84) is annular defining a base portion (86) to receive said base (92) and a pair of leg portions (88) extending from said base portion (86) and in communication with said cavity (66) to receive said legs (94).

4. A terminal (10) as set forth in claim 1 wherein said connecting member (60) includes a cap (64) extending radially outwardly from said body (62) to close said at least one open end (50).

5. A terminal (10) as set forth in claim 4 wherein said body (62) extends through said aperture (48) and said cap (64) abuts said housing (44) to prevent access to said retainer (90) disposed inside said housing (44) such that said retainer (90) cannot be disengaged from a groove (32) of the control member (14).

6. A terminal (10) as set forth in claim 1 wherein said body (62) includes a flange (76) extending radially outwardly and cooperating with said housing (44) to provide a snap-fit therebetween.

7. A terminal (10) as set forth in claim 6 wherein said flange (76) includes a tapered surface (78) and a flat surface (80), said flat surface (80) abutting said housing (44) when said body (62) extends through said aperture (48).

8. A terminal (10) as set forth in claim 6 wherein said groove (84) is spaced axially from said flange (76) for aligning said groove (84) with a groove (32) in the control member (14) when the control member (14) is inserted into said cavity (66).

9. A terminal (10) as set forth in claim 1 wherein said housing (44) includes at least one slot (56) extending along said aperture (48).

10. A terminal (10) as set forth in claim 9 wherein said body (62) includes at least one tab (72) extending radially outwardly to be received in said at least one slot (56) to align said connecting member (60) with said housing (44) when assembled together.

11. A terminal (10) as set forth in claim 1 wherein said body (62) includes at least one slit (70) to allow said body (62) to be press fit inside said aperture (48).

12. A motion transmitting remote control assembly (12) securable to a control member (14) in a vehicle, said assembly comprising:

a conduit (16);

a core element (20) movably supported in said conduit (16);

a terminal (10) coupled to said conduit (16) for connecting said core element (20) to the control member (14), said terminal (10) having a housing (44) coupled to said core element (20) with said housing (44) defining an aperture (48) forming at least one open end (50);

a connecting member (60) having a body (62) disposed in said aperture (48) with said body (62) having a cavity (66) for receiving the control member (14) and a groove (84) in communication with said cavity (66) and a load axis (A) extending axially through said cavity (66) of said body (62); and a retainer (90) disposed transversely to said load axis (A) and disposed in said groove (84) of said body (62) with said retainer (90) disposed in said aperture (48) when said connecting member (60) is in said housing (44) and said retainer (90) extending into said cavity (66) for engaging the control member (14) to retain said terminal (10) to the control member (14) and to prevent non-destructive removal of said terminal (10) from the control member (14).

13. A motion transmitting remote control assembly (12) as set forth in claim 12 wherein said retainer (90) has a base (92) and a pair of legs (94) extending from said base (92) and spaced from each other and adapted to be deflected apart by the control member (14) when said terminal (10) is attached to the control member (14).

14. A motion transmitting remote control assembly (12) as set forth in claim 13 wherein said groove (84) is annular defining a base portion (86) to receive said base (92) and a pair of leg portions (88) extending from said base portion (86) and in communication with said cavity (66) to receive said legs (94).

15. A motion transmitting remote control assembly (12) as set forth in claim 12 wherein said connecting member (60) includes a cap (64) extending radially outwardly from said body (62) to close said at least one open end (50).

16. A motion transmitting remote control assembly (12) as set forth in claim 15 wherein said body (62) extends through said aperture (48) and said cap (64) abuts said housing (44) to prevent access to said retainer (90) disposed inside said housing (44) such that said retainer (90) cannot be disengaged from a groove (32) of the control member (14).

17. A motion transmitting remote control assembly (12) as set forth in claim 12 wherein said body (62) includes a flange (76) extending radially outwardly and cooperating with said housing (44) to provide a snap-fit therebetween.

18. A motion transmitting remote control assembly (12) as set forth in claim 17 wherein said flange (76) includes a tapered surface (78) and a flat surface (80), said flat surface (80) abutting said housing (44) when said body (62) extends through said aperture (48).

19. A motion transmitting remote control assembly (12) as set forth in claim 17 wherein said groove (84) is spaced axially from said flange (76) for aligning said groove (84) with a groove (32) in the control member (14) when the control member (14) is inserted into said cavity (66).

20. A motion transmitting remote control assembly (12) as set forth in claim 12 wherein said housing (44) includes at least one slot (56) extending along said aperture (48).

21. A motion transmitting remote control assembly (12) as set forth in claim 20 wherein said body (62) includes at least one tab (72) extending radially outwardly to be received in said at least one slot (56) to align said connecting member (60) with said housing (44) when assembled together.

22. A motion transmitting remote control assembly (12) as set forth in claim 12 wherein said body (62) includes at least one slit (70) to allow said body (62) to be press fit inside said aperture (48).

\* \* \* \* \*